United States Patent [19]

Meynier

[11] Patent Number: 5,193,344
[45] Date of Patent: Mar. 16, 1993

[54] CONTROL ASSEMBLY FOR A HYDRAULIC CIRCUIT OF A VEHICLE

[75] Inventor: Guy Meynier, Aulnay-sous-Bois, France

[73] Assignee: Bendix Europe Services Techniques, Drancy, France

[21] Appl. No.: 717,565

[22] Filed: Jun. 19, 1991

[51] Int. Cl.⁵ .................. B60T 13/00; F15B 9/10
[52] U.S. Cl. ...................... 60/547.1; 91/369.1; 91/376 R
[58] Field of Search .......... 60/547; 91/369.1, 369.2, 91/369.3, 369.4, 376 R

[56] References Cited

U.S. PATENT DOCUMENTS

| | | | |
|---|---|---|---|
| 2,968,962 | 1/1961 | Randol | 60/547.1 X |
| 3,049,100 | 8/1962 | Rike | 60/547.1 X |
| 3,183,789 | 5/1965 | Stelzer | 91/376 R X |
| 3,499,288 | 3/1970 | Randol | 91/376 R |
| 4,469,008 | 9/1984 | Seki | 91/376 R |
| 4,826,121 | 5/1989 | Rossigno et al. | 60/547.1 X |
| 4,884,403 | 12/1989 | Weber | 60/547.1 |

FOREIGN PATENT DOCUMENTS 319819 4/1957 Switzerland ............ 60/547.1

Primary Examiner—Edward K. Look
Assistant Examiner—John Ryznic
Attorney, Agent, or Firm—Larry J. Palguta; Ken C. Decker

[57] ABSTRACT

The control assembly for a hydraulic circuit of a vehicle having an engine compartment and a passenger compartment which are separated by an apron (22) comprises:
a vacuum booster (16) having one axis (18) and including:
an actuating rod (20) projecting into the passenger compartment;
a shell (14) which is intended to be fastened by its periphery to the apron (22) in the engine compartment and to which a master cylinder (10) is fastened; and
a cover (26) closing the shell and bearing circumferentially on the apron (22) in the engine compartment,
a pedal unit for actuating the booster, including at least one pedal (30) mounted on a lever (32), the pivot (34) of which is retained by a bearing piece (36) fixed to the cover. The projection of the pivot (34) in the plane of fastening of the assembly to the apron (22) is located within the perimeter of the orifice of the apron, so as to transmit substantially the entirety of the force exerted by the lever (32) on the pivot (34) in a direction substantially parallel to the axis (18) of the booster (16) in order to oppose the tearing force generated between the assembly and the apron (22) during the actuation of the pedal unit.

7 Claims, 3 Drawing Sheets

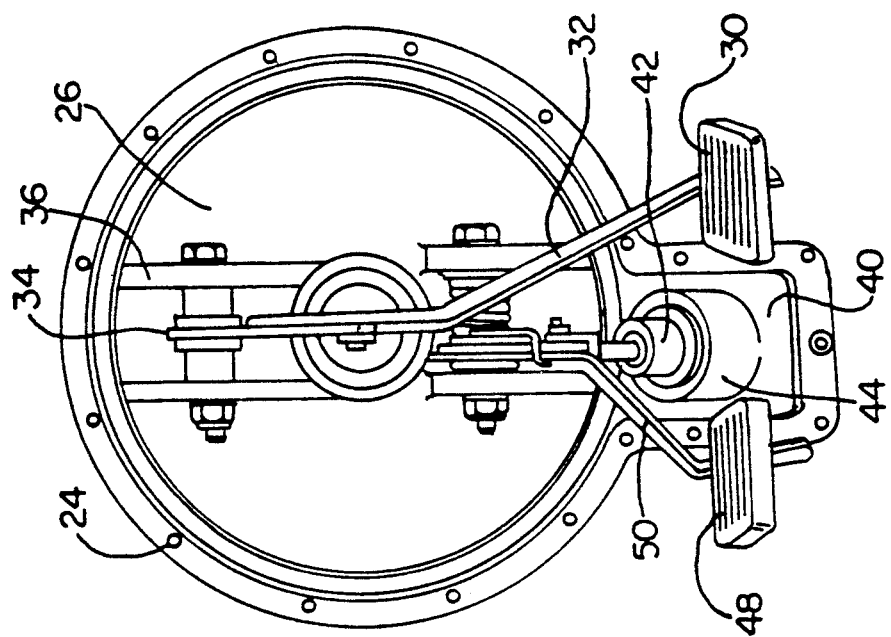
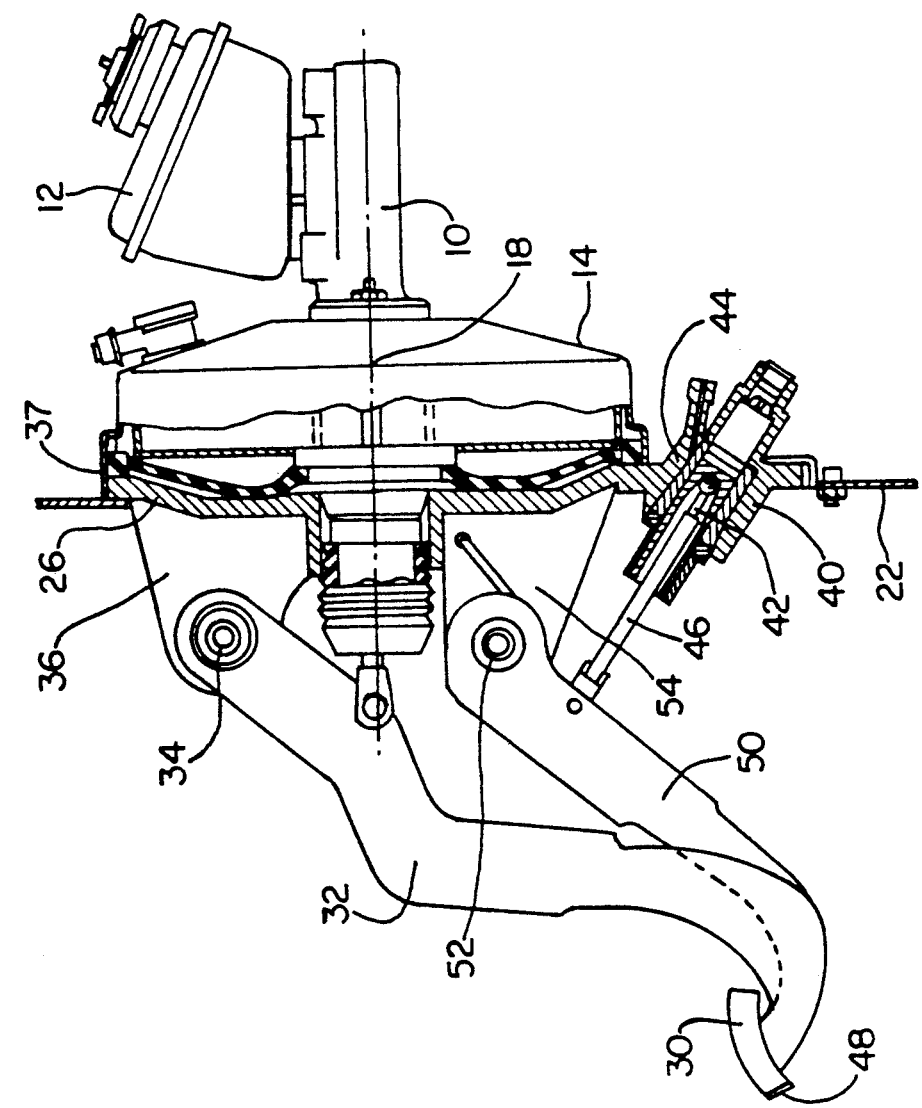

CONTROL ASSEMBLY FOR A HYDRAULIC CIRCUIT OF A VEHICLE

BACKGROUND OF THE INVENTION

The present invention relates to a control assembly for a hydraulic circuit of a vehicle having an engine compartment and a passenger compartment which are separated by an apron, the assembly comprising:
a vacuum booster having one axis and including:
- an actuating rod projecting into the passenger compartment,
- a shell which is intended to be fastened by its periphery to the apron in the engine compartment and to which a master cylinder is fastened, and
- a cover closing the shell and bearing circumferentially on the apron in the engine compartment,
- a pedal unit for actuating the booster, including at least one pedal mounted on a lever, the pivot of which is retained by a bearing piece fixed to the cover.

Similar assemblies are known, for example, from the documents FR-A-2,216,154 and EP-A-0,104,105. In these examples, an intermediate fastening plate is provided between the pedal unit and the booster. In fact, the forces generated during a breaking operation both at the fastening points of the booster to the plate and at the fastening point of the bearing piece of the pedal pivot are very high, and it is necessary to reinforce the apron of the vehicle correspondingly by means of this plate.

U.S. Pat. No. A-4,469,008 also makes known a booster for a motor cycle, having a bearing piece fixed to the cover. It also possesses a reaction piece absorbing the forces, with the result that a fastening apron is not necessary. However, the two pieces tend to exert torsion on the booster.

SUMMARY OF THE INVENTION

An object of the present invention is to overcome this disadvantage by means of an assembly not needing such a plate and therefore to make the assembly lighter.

According to the present invention, the projection of the pivot in the plane of fastening of the assembly to the apron is located within the perimeter of the orifice of the apron, so as to transmit substantially the entirety of the force exerted by the lever on the pivot in a direction substantially parallel to the axis of the booster in order to oppose the tearing force generated between the assembly and the apron during the actuation of the pedal unit.

Preferably, according to the invention, the cover has a radial protuberance, to which is fastened a pressure generator controlled by a second pedal unit, the bearing piece of which is fixed to the cover.

Likewise preferably, the pressure generator is a clutch-release transmitter, the cylinder of which forms one piece with the protuberance.

BRIEF DESCRIPTION OF THE DRAWINGS

The invention will now be described by way of example with reference to the accompanying drawings in which:

FIGS. 3 and 4 illustrate diagrammatically an embodiment of the assembly according to the invention, one in a partial sectional profile and the other in a rear view.

DETAILED DESCRIPTION OF THE INVENTION

Figure 1:
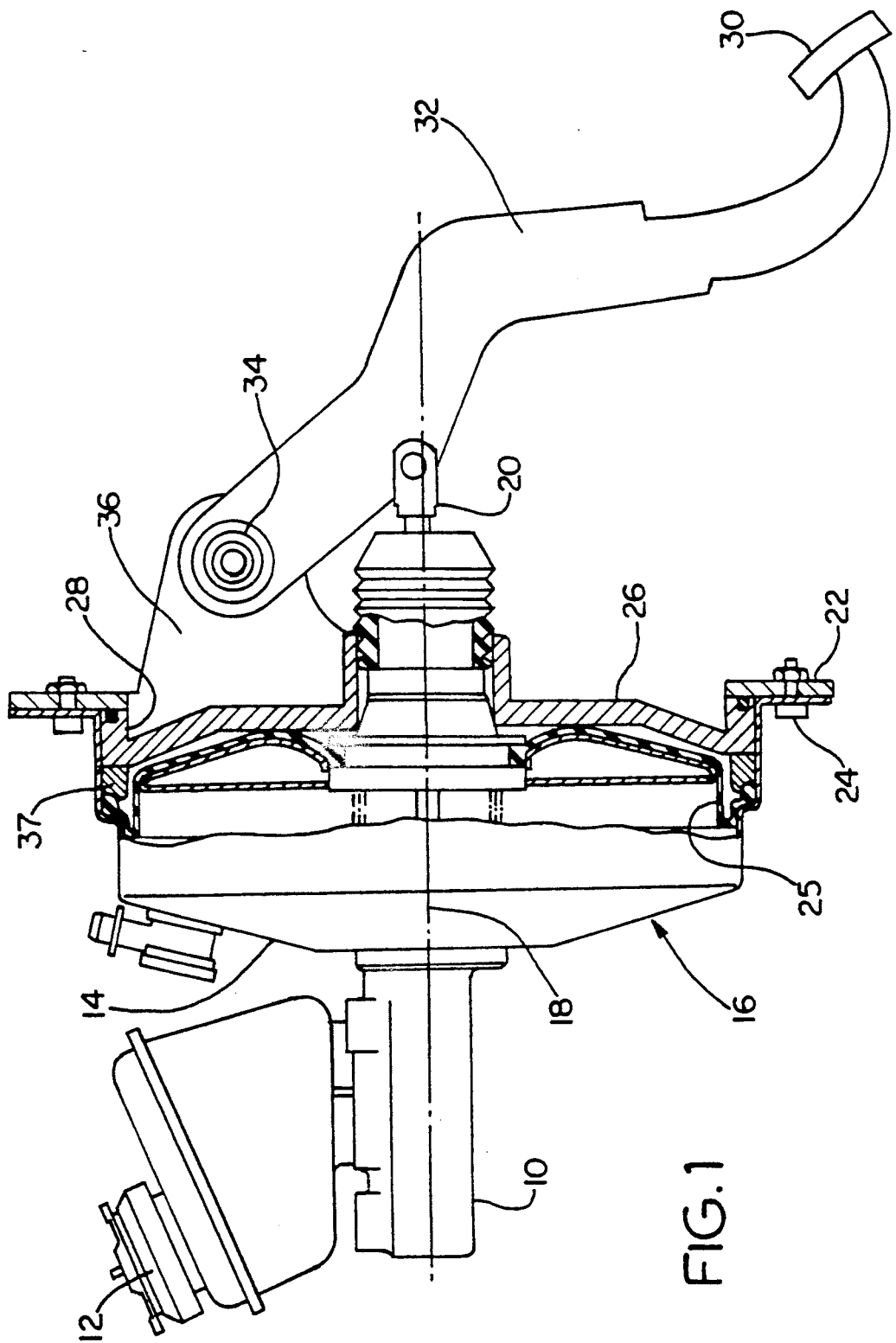
FIG. 1 shows a diagrammatic side view of an assembly according to the present invention.

Referring now to FIG. 1, an average person skilled in the art will recognize the master cylinder 10, equipped with its reservoir 12, fastened to the shell 14 of the booster 16 in the axis 18 of the booster equipped with its actuating rod 20. The shell 14 is fastened on its periphery to the apron 22 of the vehicle, for example by means of screws 24 in the engine compartment.

The shell of the booster 16 is closed by means of a cover 26 bearing with its periphery 28 on the apron 22 in the engine compartment.

Figure 2:
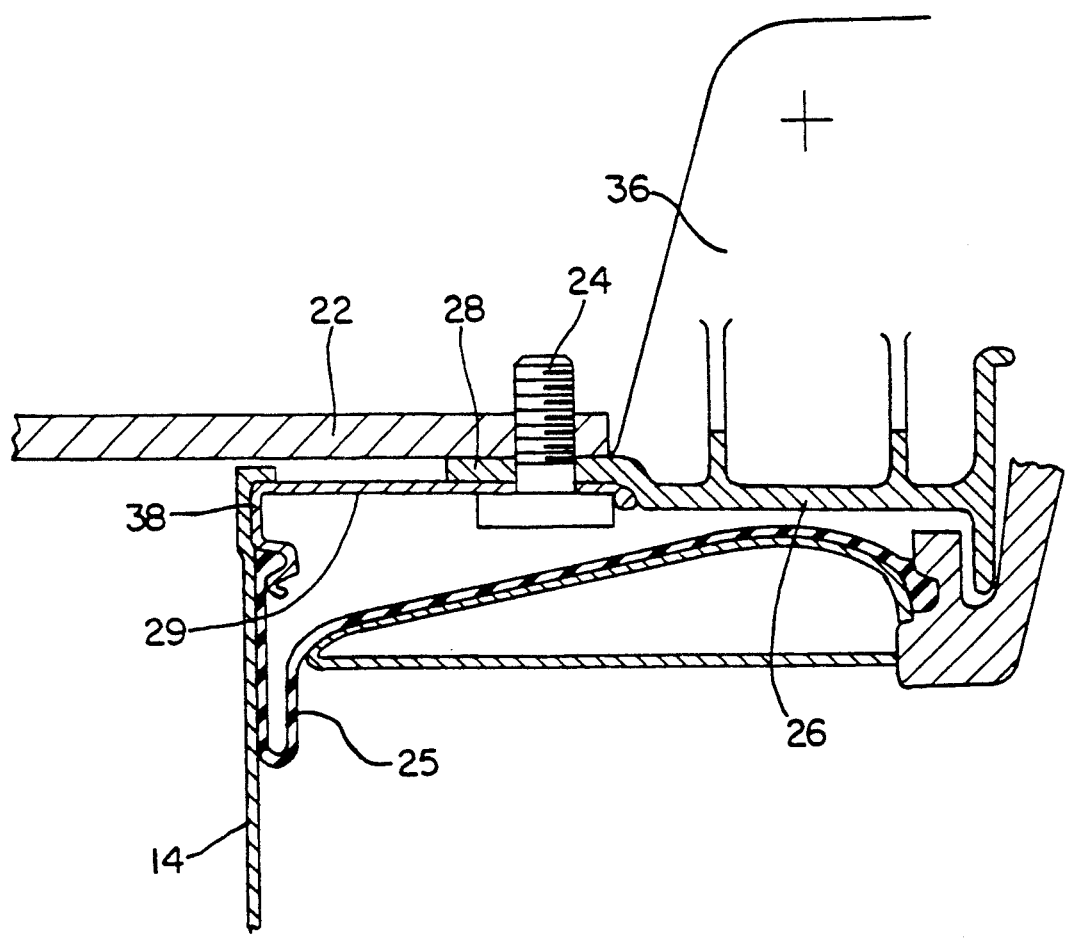
FIG. 2 shows diagrammatically and partially an assembly according to the invention provided with another mode of fastening.

FIG. 2 illustrates as a particular example another mode of fastening of the shell 14 to the apron 22, according to which an intermediate rigid disk 29, the central orifice of which interacts with the cover 26, is used. The outer peripheral edge 38 of the disk 29 can thus advantageously be curved to form a support for the unrolling diaphragm 25 of the booster. Alternatively, it is also possible for the disk 29 and the cover 26 to form only one piece.

It is also possible for the shell 14 to be fastened to the apron 22 by means of the cover 26.

The actuating rod 20 of the booster projects into the passenger compartment of the vehicle. A pedal 30 is mounted on a lever 32 having a pivot 34, the actuating rod 20 of the booster 16 being fastened to the lever 32 between the pedal 30 and the pivot 34. The pivot 34 is retained by a bearing piece 36 fixed to the cover 26. As can be seen, the projection of the pivot in the plane of fastening of the assembly to the apron is located within the perimeter of the orifice of the apron.

When the driver of the vehicle so equipped presses on the pedal 30, the force which he exerts is applied to the actuating rod 20 of the booster 16, multiplied by the ratio of the lever 32. This force is transmitted to the piston of the master cylinder 10, further multiplied by the boost factor of the booster. A force tearing the shell 14 at its fastening points to the apron 22, directed substantially parallel to the axis 18 and towards the engine compartment, is therefore generated.

However, the force applied to the lever generates on the pivot 34 a force substantially parallel to the axis 18 and directed towards the passenger compartment and therefore opposed to the preceding force. This force is transmitted to the cover 26 by the bearing piece 36. The cover 26, made of sufficiently rigid material, distributes this force to its periphery and generates on the apron 22, in the region of its periphery 28, a force which is therefore opposed to the above-mentioned tearing force. The result of this is that the apron 22 is subjected to two opposing forces, the resultant of which corresponds substantially to the force exerted by the driver. The presence of a plate is therefore no longer necessary.

According to a preferred embodiment, the bearing piece 36 and the cover 26 form only one piece which is produced by molding from a material having a high resistance and a high resilience, such as a polymer material filled, if appropriate, with fibers, for example of glass, and ribbed. Preferably, a ring 37 forming a support for the unrolling diaphragm of the booster 16 is also integrated in the bearing piece 36 and in the cover 26.

Of course, an average person skilled in the art can make many modifications to the present invention, without departing from its scope, as defined by the accompanying claims.

For example, a second bearing piece, such as the piece 36, can also be integrated in the cover 26 in order to carry the pivot of another lever equipped with a pedal.

In FIGS. 3 and 4, it can be seen that the cover 26 has a radial protuberance 40, to which a clutch-release transmitter 42 is fastened.

The cylinder 44 of this transmitter forms one piece with the protuberance 40.

The piston of the transmitter 42 is connected by means of a pusher 46 to an actuating pedal unit including a pedal 48 mounted on a lever 50, the pivot 52 of which is retained by a bearing piece 54 fixed to the cover 26.

It will also be possible for the supporting piece of the steering column likewise to be integrated in the cover 26.

What we claim is:

1. A control assembly for a hydraulic circuit of a vehicle having an engine compartment and a passenger compartment which are separated by an apron having an orifice closed by said assembly, comprising:
a vacuum booster having one axis including:
   an actuating rod projecting into the passenger compartment,
   a shell which is fastened by its periphery to said apron in the engine compartment and to which a master cylinder is fastened, and
   a cover closing said shell and bearing circumferentially on the apron in the engine compartment,
a pedal unit for actuating said booster, including at least one pedal mounted on a lever, the pivot of which is retained by a bearing piece fixed to said cover, a projection of said pivot toward said apron and parallel to said one axis being located within the perimeter of said orifice of the apron, so as to transmit substantially the entirety of the force exerted by the lever on said pivot in a direction substantially parallel to said axis of the booster in order to oppose a tearing force generated between said assembly and said apron during the actuation of said pedal unit.

2. The assembly according to claim 1, wherein said shell is fastened to said apron by means of a rigid disk, the central orifice of which interacts with said cover.

3. The assembly according to claim 2, wherein the rigid disk and the cover form one piece.

4. The assembly according to claim 3, wherein the outer peripheral edge of said disk is curved to form a support for an unrolling diaphragm.

5. The assembly according to any one of the claim 1, wherein said shell is fastened to the apron by means of said cover.

6. The assembly according to claim 1, wherein said cover has a radial protuberance, to which is fastened a pressure generator controlled by a second pedal unit, and a bearing piece of the second pedal unit being fixed to said cover.

7. The assembly according to claim 6, wherein said pressure generator is a clutch-release transmitter, the cylinder of which forms one piece with said protuberance.

* * * * *